(12) United States Patent
Kropf

(10) Patent No.: US 8,052,848 B2
(45) Date of Patent: Nov. 8, 2011

(54) ULTRASONIC AND MICROWAVE METHODS FOR ENHANCING THE RATE OF A CHEMICAL REACTION AND APPARATUS FOR SUCH METHODS

(75) Inventor: Matthew M. Kropf, State College, PA (US)

(73) Assignee: The Penn State Research Foundation, University Park, PA (US)

(*) Notice: Subject to any disclaimer, the term of this patent is extended or adjusted under 35 U.S.C. 154(b) by 441 days.

(21) Appl. No.: 12/146,932

(22) Filed: Jun. 26, 2008

(65) Prior Publication Data

US 2009/0000941 A1    Jan. 1, 2009

Related U.S. Application Data

(60) Provisional application No. 60/946,253, filed on Jun. 26, 2007.

(51) Int. Cl.
| | |
|---|---|
| B01J 19/10 | (2006.01) |
| B01J 19/12 | (2006.01) |
| A62D 3/00 | (2007.01) |
| C01B 3/00 | (2006.01) |
| C01B 13/00 | (2006.01) |
| C01B 31/00 | (2006.01) |
| C07F 1/00 | (2006.01) |
| C07C 1/00 | (2006.01) |
| C07C 51/00 | (2006.01) |
| C07B 63/00 | (2006.01) |

(52) U.S. Cl. ......... 204/157.42; 204/157.43; 204/157.47; 204/157.48; 204/157.5; 204/157.52; 204/157.6; 204/157.62; 204/157.78; 204/157.82; 204/157.88; 204/158.21; 204/157.15

(58) Field of Classification Search ............. 204/157.42, 204/157.43, 157.47–157.48, 157.5, 157.52, 204/157.6, 157.62, 157.78, 157.82, 157.88, 204/157.98, 157.15, 158.21
See application file for complete search history.

(56) References Cited

U.S. PATENT DOCUMENTS 1,734,975 A * 11/1929 Loomis et al. ............ 204/157.43
(Continued)

FOREIGN PATENT DOCUMENTS

BR    200601246 A * 11/2007
(Continued)

OTHER PUBLICATIONS

Chemat, F. et al, "An Original Microwave-Ultrasound Combined Reactor Suitable for Organic Synthesis: Application to Pyrolysis and Esterification," Journal of Microwave Power and Electromagnetic Energy, 1996; 31, pp. 19-22.*
(Continued)

Primary Examiner — Keith Hendricks
Assistant Examiner — Colleen M. Raphael
(74) Attorney, Agent, or Firm — Gifford, Krass, Sprinkle, Anderson & Citkowski, P.C.

(57) ABSTRACT

The invention relates generally to chemical reactions and processes, and in particular to a method for enhancing the rate of a chemical reaction and to apparatus for carrying out the method. The invention more particularly relates to methods and apparatus which utilize microwave and ultrasonic energy to enhance chemical reaction rates; and in specific instances, the invention relates to methods, processes and apparatus for the synthesis of biodiesel fuels. The methods, processes and apparatus of the invention are useful for the synthesis of biodiesel fuels; and also useful for production of reaction products of esterification and/or transesterification reactions including fatty acid alkyl esters.

30 Claims, 7 Drawing Sheets

U.S. PATENT DOCUMENTS

| | | | | |
|---|---|---|---|---|
| 1,992,938 | A * | 3/1935 | Chambers et al. | 204/157.62 |
| 2,745,861 | A * | 5/1956 | Bodine, Jr. | 204/157.15 |
| 2,985,674 | A * | 5/1961 | McGuine et al. | 554/141 |
| 3,306,835 | A * | 2/1967 | Magnus | 204/157.62 |
| 3,630,866 | A * | 12/1971 | Pelofsky | 204/157.62 |
| 4,050,907 | A | 9/1977 | Brimhall | |
| 4,108,759 | A | 8/1978 | Young | |
| 4,466,870 | A * | 8/1984 | Boudjouk et al. | 204/157.62 |
| 5,055,410 | A | 10/1991 | Blumenthal et al. | |
| 5,393,492 | A * | 2/1995 | Di Martino et al. | 422/62 |
| 5,882,623 | A | 3/1999 | Zaluska et al. | |
| 5,997,590 | A | 12/1999 | Johnson et al. | |
| 6,061,926 | A * | 5/2000 | Pare et al. | 204/157.6 |
| 6,653,517 | B2 | 11/2003 | Bullock | |
| 6,884,900 | B2 | 4/2005 | Maeda et al. | |
| 6,989,676 | B2 | 1/2006 | Nagy | |
| 7,045,100 | B2 * | 5/2006 | Ergun et al. | 422/129 |
| 7,157,401 | B2 | 1/2007 | Purta et al. | |
| 7,256,301 | B2 * | 8/2007 | Erguen et al. | 554/167 |
| 7,491,858 | B2 * | 2/2009 | Murzin et al. | 204/157.15 |
| 7,518,092 | B2 * | 4/2009 | Purta et al. | 422/21 |
| 7,714,258 | B2 * | 5/2010 | Dalton | 219/759 |
| 7,741,508 | B2 * | 6/2010 | Sinha et al. | 560/55 |
| 7,772,414 | B1 * | 8/2010 | Hybertson et al. | 554/169 |
| 2002/0013486 | A1 * | 1/2002 | Ergun et al. | 422/186 |
| 2004/0074760 | A1 * | 4/2004 | Portnoff et al. | 204/157.15 |
| 2004/0159537 | A1 * | 8/2004 | Maeda et al. | 204/157.62 |
| 2005/0027137 | A1 * | 2/2005 | Hooker | 422/99 |
| 2005/0065357 | A1 * | 3/2005 | Ergun et al. | 554/176 |
| 2005/0274065 | A1 | 12/2005 | Portnoff et al. | |
| 2006/0162245 | A1 * | 7/2006 | Porter et al. | 44/605 |
| 2007/0161095 | A1 | 7/2007 | Gurin | |
| 2007/0175092 | A1 * | 8/2007 | Ames | 44/629 |
| 2007/0185341 | A1 * | 8/2007 | Ergun et al. | 554/167 |
| 2007/0249851 | A1 * | 10/2007 | Dall'Oglio et al. | 554/174 |
| 2008/0119664 | A1 * | 5/2008 | Sinoncelli et al. | 554/176 |
| 2008/0184616 | A1 * | 8/2008 | Misra et al. | 44/308 |
| 2008/0188676 | A1 * | 8/2008 | Anderson et al. | 435/289.1 |
| 2008/0256845 | A1 * | 10/2008 | Meikrantz | 422/186 |
| 2008/0264934 | A1 * | 10/2008 | Moreira et al. | 219/690 |
| 2008/0289248 | A1 * | 11/2008 | Gao | 44/308 |
| 2008/0312460 | A1 * | 12/2008 | Goodson | 422/129 |
| 2009/0314627 | A1 * | 12/2009 | O'Connor et al. | 204/157.15 |
| 2010/0130763 | A1 * | 5/2010 | Gao | 554/167 |
| 2010/0163402 | A1 * | 7/2010 | Seo | 204/157.62 |

FOREIGN PATENT DOCUMENTS

| | | | |
|---|---|---|---|
| CN | 1935947 A * | 3/2007 | |
| EP | 1849854 A1 * | 10/2007 | |
| JP | 05000241 | 1/1993 | |
| JP | 14113350 | 4/2002 | |
| WO | WO 03014272 A2 * | 2/2003 | |
| WO | WO-2004101574 | 11/2004 | |

OTHER PUBLICATIONS

Barnard, T.M. et al, "Continuous-Flow Preparation of Biodiesel Using Microwave Heating," Energy & Fuels 2007 (21), pp. 1777-1781.*

Hernando, J. et al, "Biodiesel and FAME Synthesis Assisted by Microwaves: Homogeneous Batch and Flow Processes," Fuel 86 (2007), pp. 1641-1644.*

Leadbeater, N.E. and Stencel, L.M., "Fast, Easy Preparation of Biodiesel Using Microwave Heating," Energy & Fuels 2006 (20), pp. 2281-2283.*

Singh, A.K. et al, "Base-Catalyzed Fast Transeterification of Soybean Oil Using Ultrasonication," Energy & Fuels 2007 (21), pp. 1161-1164.*

Stavarache, C. et al, "Aspects of Ultrasonically Assisted Transesterification of Various Vegetable Oils with Methanol,", Ultrasonics Sonochemistry 14 (2007) pp. 380-386.*

Stavarache. C. et al, "Ultrasonically Driven Continuous Process for Vegetable Oil Transesterfication," Ultrasonics Sonochemistry 14 (2007) pp. 413-417.*

Ma, Fangrui et al, "The Effect of Mixing on Transesterification of Beef Tallow," Bioresource Technology 69 (1999), pp. 289-293.*

Nuechter, M. et al, "Organic Processes Initiated by Non-Classical Energy Sources," Journal of Physical Organic Chemistry 2000 (13), pp. 579-586.*

Mazzocchia, C. et al., "Fast Synthesis of Biodiesel from Triglycerides in Presence of Microwaves," Advances in Microwave and Radio Frequency Processing: Report from the 8th International Conference on Microwave and High Frequency Heating held in Bayreuth, Germany, Sep. 3-7, 2001 pp. 370-376 (Copyright 2006).*

Peng, Yanqing and Song, Gonghua, "Simultaneous Microwave and Ultrasound Irradiation: A Rapid Synthesis of Hydrazides," Green Chemistry, 2001 (3) pp. 302-304.*

Noureddini, H. and Zhu, D., "Kinetics of Transesterification of Soybean Oil," Journal of American Oil Chemists 74, pp. 1457-1463 (1997).*

Verziu, M. et al, "Sunflower and Rapeseed Oil Transesterification to Biodiesel Over Different Nanocrystalline MgO Catalysts," Green Chemistry 2008 (10) pp. 373-381.*

Derwent abstract of BR 200601246A, "Microwave and Ultrasound Based Production of Biodiesel Comprises Transesterification and Agitation in a Controlled Reaction Sequence," Guimaraes Wilmar Gomes, Nov. 27, 2007.*

Derwent abstract of WO 03014272 A2, "Processes and Device for Improving the Reactivity of Natural Triglycerides With Microwave Radiation ," Breccia Fratadocchi Alberto, Feb. 20, 2003.*

Darnoko, D. and Cheryan, M. "Kinetics of Palm Oil Transesterification in a Batch Reactor," J. of the American Oil Chemists' Society, vol. 77, No. 12, pp. 1263-1267.*

Translation of CN 1935947A.*

Aranda et al, "Acid-Catalyzed Homogeneous Esterification Reaction for Biodiesel Production from Palm Fatty Acids," Catal. Lett. (2008) 122:20-25.*

Freedman et al, "Transesterification Kinetics of Soybean Oil," J. Am. Oil Chem. Soc., vol. 63, No. 10 (Oct. 1986), pp. 1375-1380.*

Cravotto, G. and P. Cintas. "The Combined Use of Microwaves and Ultrasound: Improved Tools in Process Chemistry and Organic Synthesis." Chemistry- A European Journal, 2007.

Chemat, F. and E. Esveld. "Microwave Super-Heated Boiling of Organic Liquids: Origin, Effect and Application." Chemical Engineering and Technology 2001, vol. 24, pp. 735-744.

D'Ippolito, S.A., J.C. Yori, M.E. Iturria, C.L. Pieck, and C.R. Vera. "Analysis of a Two-Step, Noncatalytic, Supercritical Biodiesel Production Process with Heat Recovery." Energy and Fuels 2007, vol. 21, pp. 339-346.

Dasari, M., M. Goff, and G. Suppes. "Noncatalytic Alcoholysis Kinetics of Soybean Oil." Journal of the American Oil Chemists Society 2003, vol. 80.

Chemat, F., M. Poux, and S. Galema. "Esterification of stearic acid by isomeric forms of butanol in a microwave oven under homogenous and heterogeneous reaction conditions." Journal of the Chemical Society, Perkins Transactions 2, 1997, pp. 2371-2374.

Kusidiana, D. and S. Sake. "Kinetics of transesterification in rapeseed oil to biodiesel fuel as treated in supercritical methanol." Fuel 2001, vol. 80, pp. 693-698.

Warabi, Y., D. Kusdiana, S. Saka. "Reactivity of triglycerides and fatty acids of rapeseed oil in supercritical alcohols." Bioresource Technology 2004, vol. 91, pp. 283-287.

* cited by examiner

ULTRASONIC AND MICROWAVE METHODS FOR ENHANCING THE RATE OF A CHEMICAL REACTION AND APPARATUS FOR SUCH METHODS

REFERENCE TO RELATED APPLICATION

This application claims priority from U.S. Provisional Patent Application Ser. No. 60/946,253, filed Jun. 26, 2007, the entire content of which application is hereby incorporated herein by reference.

FIELD OF THE INVENTION

This invention relates generally to chemical reactions and processes, and in particular to a method for enhancing the rate of a chemical reaction and to apparatus for carrying out the method. The invention more particularly relates to methods and apparatus which utilize microwave and ultrasonic energy to enhance chemical reaction rates; and in specific instances, the invention relates to processes and apparatus for the synthesis of biodiesel fuels.

BACKGROUND OF THE INVENTION

Biofuels are known in the art to comprise hydrocarbon fuels derived from living sources, as opposed to hydrocarbons derived from petroleum-based sources. Biodiesel fuels comprise fatty acid esters and other such compounds typically prepared from plant derived oil, waste, greases, tallows, and the like. In a typical preparation process, the fatty acid feedstock undergoes various chemical reactions. One such set of reactions comprises transesterification which serves to convert fatty acids, and high molecular weight fatty esters into esters of relatively low molecular weight (C1-C5) alcohols. By control of transesterification and other processes and/or reactions, physical properties of the resultant biodiesel fuel, such as solidification point, boiling point, cetane number, and the like, may be selectively controlled. In some instances, further chemical reactions are carried out which can alter the chain the length of the feedstock, or otherwise control the resultant properties of the final product.

In a typical transesterification reaction of the prior art as used for the preparation of biodiesel fuels, the fatty acid feedstock is reacted with a relatively short chain alcohol, at elevated temperatures, in the presence of a catalyst. Very often, the reactions are carried out under high-pressure conditions. In one typical known reaction, the reacting alcohol is methanol, and present in a 9:1 ratio to the oily component. The reaction is typically carried out at elevated temperatures in a pressure vessel, in the presence of relatively large amounts of an alkaline catalyst. Typical reaction times may be on the order of hours.

In some instances, fuels are prepared from feedstocks which include high free fatty acid oils. Such oils are obtained from tallows, waste oils and other sources. Problems occur in the use of such feedstocks in known processes, due to the formation of soaps. The process of the present invention, as will be described hereinbelow, greatly reduces or eliminates such soap formation.

The foregoing types of reactions consume significant amounts of energy because of the degree and duration of the heating. Furthermore, high-pressure conditions complicate the apparatus and process. Accordingly, it will be appreciated that there are significant advantages to be achieved if chemical reactions, such as those used for the preparation of biodiesel fuels can be carried out at lower temperatures and/or for shorter periods of time. As will be explained hereinbelow, the present invention provides methods and apparatus wherein the combined application of microwave energy and ultrasonic energy produces a synergistic interaction which greatly enhances chemical reactivity of a variety of reacted species. The principles of this invention may be used with great advantage for the preparation of biodiesel fuels.

SUMMARY OF THE INVENTION

Figure 1:
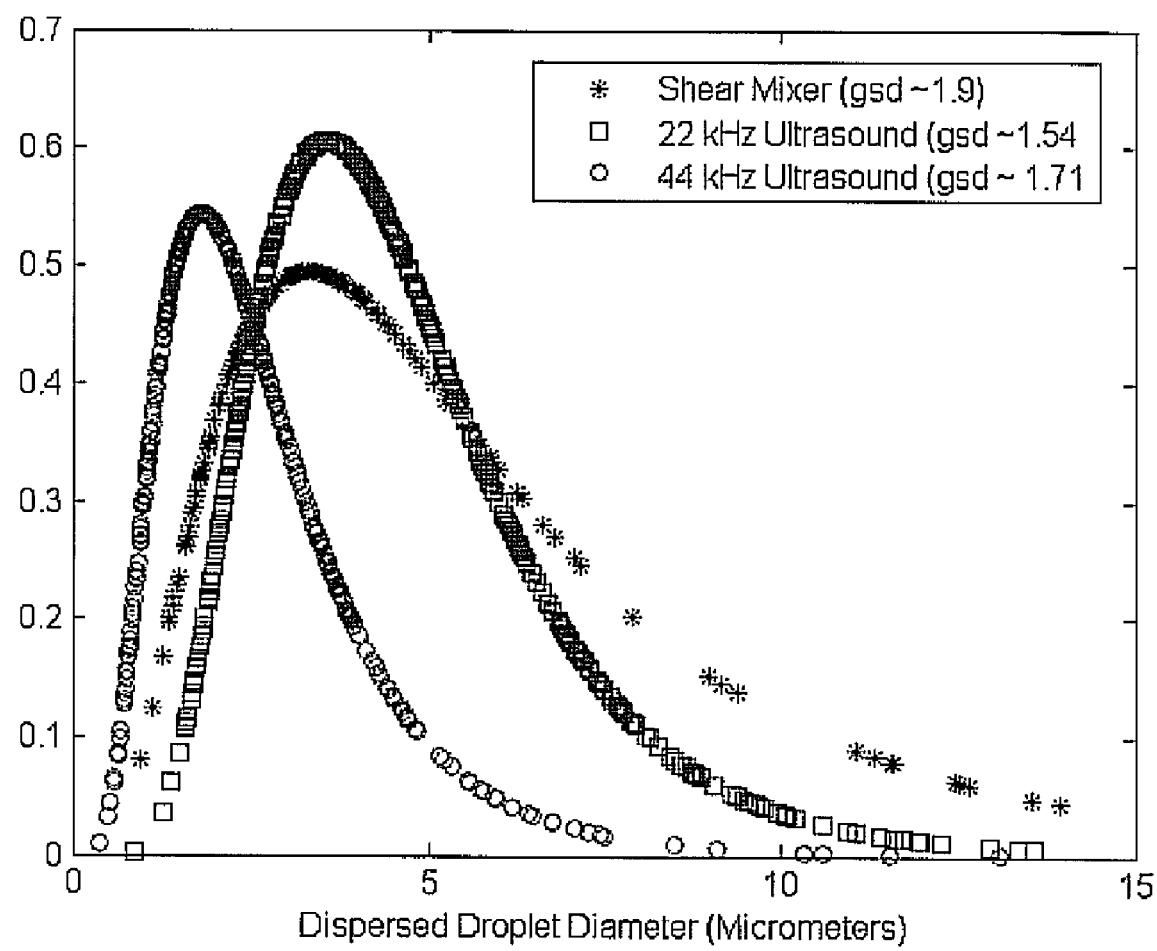
FIG. 1 shows the log-normal distribution of dispersed methanol droplets in soybean oil by way of ultrasonic and conventional shear emulsification.

This invention relates generally to chemical reactions and processes, and in particular to a method for enhancing the rate of a chemical reaction and to apparatus for carrying out the method. The invention more particularly relates to methods and apparatus which utilize microwave and ultrasonic energy to enhance chemical reaction rates; and in specific instances, the invention relates to methods, processes and apparatus for the synthesis of biodiesel fuels. The methods, processes and apparatus of the invention are useful for the synthesis of biodiesel fuels; and also useful for production of reaction products of esterification and/or transesterification reactions including fatty acid alkyl esters.

In one aspect, the invention provides a method for enhancing a chemical reaction or process in a reaction mixture, said method comprising the steps of: providing a reaction mixture comprising at least two immiscible reactants; inputting microwave energy into said reaction mixture; and inputting ultrasonic energy into said reaction mixture.

In one embodiment of the inventive method, the step of inputting said microwave energy is carried out for a first period of time, and the step of inputting said ultrasonic energies carried out for a second period of time; and said first and second periods of time at least partially overlap.

In another embodiment of the inventive method, the step of inputting said microwave energy is carried out for a first period of time, and said step of inputting said ultrasonic energies is carried out for a second period of time; and said first and second periods of time do not overlap.

In another embodiment, the inputting of ultrasound energy is commenced before the inputting of microwave energy. In another, the second period of time is commenced before said first period of time is commenced.

In another particular embodiment of the present inventive method, the reaction comprises an esterification reaction or a transesterification reaction, or a mixture thereof. In another, when the reaction consists of an esterification reaction between n-butanol and stearic acid, the reaction mixture does not comprise k catalyst. K catalyst, also referred to as montmorillonite, KSF is commercially available, for example, from Aldrich.

In another embodiment of the present inventive method, the at least two immiscible reactants are an alcohol and an oil, and said reaction mixture further optionally comprises a catalyst. In another embodiment, the catalyst is a heterogeneous catalyst. In another, the reaction mixture does not comprise a catalyst. In another, the reaction is carried out in a glass or glass-lined vessel.

In another particular embodiment of the present inventive method, the reaction or process comprises the preparation of a biodiesel fuel. In another, the reaction or process comprises at least one fatty acid alkyl ester. In another, the fatty acid alkyl ester is a fatty acid methyl ester.

In other particular embodiments of the present inventive method, a stream of said reaction mixture is flowed through a reactor in which said microwave energy and said ultrasonic energy are input to said stream, whereby said reaction is carried out in a continuous process.

In another, the inputting of said ultrasonic energy produces an emulsion that has an average particle size of less than 5 micrometers. In another, the inputting of said ultrasonic energy produces an emulsion; and wherein 90% of particles in said emulsion have a particle size of less than 10, 9, 8, 7, 6, or 5 micrometers.

In another, the ultrasonic energy has a frequency selected from the group consisting of: a frequency of at least 22 KHz., a frequency in the range of 22 KHz to 1.0 MHz, a frequency in the range of 22 KHz to 0.5 MHz, a frequency in the range of 22 KHz to 100 KHz, a frequency in the range of 22 to 50 KHz, a frequency in the range of 22 to 50 KHz, a frequency in the range of 22 to 50 KHz, a frequency in the range of 22 to 30 KHz, a frequency in the range of 22 to 50 KHz, a frequency in the range of 22 to 30 KHz, a frequency in the range of 22, 23, 24, or 25 KHz. In another, wherein said ultrasonic energy has a frequency of 22 or 44 KHz.

In another embodiment, the microwave energy has a frequency within a range of 900 MHz to 25 GHz. In yet another particular embodiment, the microwave energy has a frequency of 2.45 GHz or 915 MHz.

In other particular embodiments of the present inventive method, the inputting of said ultrasonic energy produces an emulsion, and the inputting of microwave energy further comprises inputting sufficient microwave energy into said emulsion to produce one or more fatty acid alkyl esters. In another, the inventive method further comprises detecting one or more fatty acid alkyl esters. In another, the one or more fatty acid alkyl esters are detectably produced in less than 5, 4, 3, 2, or one hour; in less than 59, 50, 40, 30, or 20 minutes; or in less than 10, 9, 8, 7, 6, 5, 4, 3, 2, or 1 minute.

In yet other particular embodiments of the present inventive method, inputting of said ultrasonic energy produces an emulsion, and said inputting of microwave energy further comprises inputting sufficient microwave energy into said emulsion to allow said transesterification to proceed at a temperature below the critical temperature of said alcohol.

In another particular embodiment, the reaction is carried out at a temperature of at least 200, 190, 180, 170, 160, 150, 140, 13, 120, 110, 90, 80, 70, 60, 50, 40, or 30 degrees Celsius below the supercritical temperature of said alcohol. In another, the temperature is in the range of 40-150, 50-140, 60-130, 65-145, 70-120, or 60-110 degrees Celsius. In a particular embodiment, the temperature is in the range of 60-200 degrees Celsius. In another, the temperature is less than 125 degrees Celsius. In another, the temperature is less than 75 degrees Celsius.

In another aspect, the invention provides a method for manufacturing biodiesel fuel made by the method of the present invention.

In another aspect, the invention provides a reactor for enhancing the rate of a chemical reaction or process in a reaction mixture, the reactor comprising:
  a reaction vessel configured to retain a reaction mixture;
  a source of microwave energy associated with said reaction vessel and operative to direct microwave energy into a reaction mixture disposed therein; and
  a source of ultrasonic energy associated with said reaction vessel, and operative to direct ultrasonic energy into said reaction mixture.

In a particular embodiment of the present invention, the reactor further includes a controller for controlling the operation of one or more of said source of microwave energy and said source of ultrasonic energy. In another, the reactor includes sensors for process measurements for in situ feedback enabling dynamic said control of the operation. Such process measurements include those of temperature, pressure, flow rate, and the like; and the feedback is transmitted and reflected in the applied ultrasound and microwave energy. In another, the reaction vessel is configured and operable to have a reaction mixture circulated therethrough. In another, the reaction further includes a pump for circulating said reaction mixture through said reaction vessel.

In another aspect, the invention provides a method for manufacturing biodiesel fuel, the method comprising the steps of:
  providing a reaction mixture which includes an oil and an alcohol, and optionally a catalyst;
  inputting radio frequency or microwave energy into said reaction mixture so as to heat said mixture; and
  inputting ultrasonic energy into said reaction mixture.

In a particular embodiment of the present invention, the oil is a vegetable oil.

In another, the oil is derived from: biomass, algae, animal tallow, waste oil, and combinations thereof. In another, the alcohol comprises a C1-C5 alkyl alcohol.

In another aspect, the invention provides a method for manufacturing biodiesel fuel made by the method of the present invention. In one embodiment, the fatty acid alkyl ester produced by an inventive methods described herein is formulated into biodiesel fuel.

In particular embodiments of the inventive methods described herein, at least 90, 95, 96, 97, 98, or 99% of the two immiscible reactants are emulsified to an emulsion by said ultrasonic energy, and microwave energy is inputted into said emulsion.

In another aspect, the invention provides any article, apparatus or process disclosed, or substantially described herein.

DETAILED DESCRIPTION OF THE INVENTION

This invention is explained herein with reference to particular embodiments used for the preparation of biofuels such as biodiesel fuels; but it is to be understood that the methods and apparatus described herein may be used for enhancing the reactions in other chemical processes. As is to be understood "reactions" include classic chemical reactions as well as other processes such as hydrocarbon cracking, solubilization, extraction, salvation and the like.

In one aspect, the invention provides a method for enhancing a chemical reaction or process in a reaction mixture, said method comprising the steps of: providing a reaction mixture comprising at least two immiscible reactants; inputting microwave energy into said reaction mixture; and inputting ultrasonic energy into said reaction mixture.

As used herein, "two immiscible reactants" means that the two reactants form an emulsion when one is dispersed in the other. That is, the two reactants possess such difference in polarity and/or hydrophobicity that they do not form a homogenous solution when dispersed in one another, and form an emulsion instead. Typically, when combined within a vessel; and in the absence of stirring, agitation, or any other energy input into the vessel's content, two reactants that are immiscible in one another spontaneously separate into two discernible liquid phases.

For the purposes of the invention, as used herein, "emulsion" refers to the phase that includes particles or droplets of one immiscible liquid reactant dispersed in another. Thus, as used herein, emulsion excludes the non-emulsified phase. For example, in a vessel initially containing two immiscible reactant liquids, subsequent to some mixing, the vessel can contain three phases: two phases corresponding to the unmixed portion of the immiscible reactant liquids, in addition to the emulsified phase.

Generally, emulsions can include particles in the range of 0.001 to 1000 micrometers. For the purposes of the invention, upon input of sufficient ultrasonic energy into the reaction mixture the two reactants that are immiscible in one another form an emulsion that has an average particle size of less than 5 micrometers, and a distribution of less than 3.00 arithmetic standard deviation. It is recognized that if the same data series is subjected to the geometric average and standard deviation calculation described in the "Statical Calculations" below, the dispersed (emulsified) phase has an average particle size of less than 5 micrometers, and a distribution of less than 1.85 geometric standard deviation.

Statistical Calculations:
The geometric average is calculated as:

$$\bar{x}_g = \exp\left(\frac{1}{n}\sum \ln(x)\right); \text{ or}$$

the arithmetic average is calculated as:

$$\bar{x}_a = \left(\frac{1}{n}\sum (x)\right);$$

where x is the data series of diameter measurements and n is the total number of measurements.

The geometric standard deviation is calculated as:

$$\sigma_g = \sqrt{\frac{\sum (\ln(x) - \ln(\bar{x}_g))^2}{n}}; \text{ or}$$

the arithmetic standard deviation is calculated as:

$$\sigma_a = \sqrt{\frac{\sum (x - \bar{x}_a)^2}{n}}.$$

The resulting log-normal distribution is calculated as:

$$f(x) = \frac{1}{\sqrt{2\pi\ln(\sigma_g)}} \exp\left[-\frac{(\ln(x) - \ln(\bar{x}_g))^2}{2\ln(\sigma_g)}\right]$$

"An emulsion that has an average particle size of less than 5 micrometers" means that the average size of the particles present in the emulsified phase, and present up to at least three minutes from the termination of the input of the ultrasound energy is less than 5 micrometers, with the standard deviations set forth above under "statistical Calculations". Individual values for the data series are collected by determining the individual diameter of the particles by light microscopy as described herein.

For the purposes of the invention, the emulsions include emulsions wherein 90% of particles in said emulsion have a particle size of less than 10, 9, 8, 7, 6, or 5 micrometers. Each stated particle size in the preceding sentence is operative, as if stated apart from the other particle sizes collectively stated in the alternative.

"Emulsions wherein 90% of particles in said emulsion have a particle size of less than 10, 9, 8, 7, 6, or 5 micrometers" means that at least 90% of the particles present in the emulsified phase, and present up to at least three minutes from the termination of the input of the ultrasound energy have a particle size less than 10, 8, 7, 6, 5, or 4 micrometers. The particle size is the individual particle's diameter determined by light microscopy as described herein. In this regard, "sufficient ultrasonic energy" means any amount of ultrasonic energy applied at any frequency of ultrasound that produces the stated particle size or stated average particle size, including the specific frequencies described herein. Operable frequencies include 22 KHz and 44 KHz. It is recognized that in addition to the input of the sufficient ultrasound energy, the methods can optionally comprise input of additional energy such as mechanical energy from shear mixing. In this regard, for example, shear mixing can produce a course emulsion (for example, having an average diameter size of 950 micrometers) prior to the inputting of sufficient ultrasound energy.

It is recognized that the smaller the size of the average particle, the more suitable the emulsion is for the purposes of the invention, including for the purposes of microwave applications, and for the purposes of microwave applications to carry out a chemical reaction or process according to the inventive methods. Accordingly, the invention encompasses application of microwave to emulsions produced by ultrasound and having an average particle size of less than the particularly stated particle size or stated average particle size, so long as the application of microwave to said emulsion effects the particular chemical reaction set forth in a method of the invention; including, for example, etherification, transesterification, and biodiesel fuel production.

For the purposes of the invention, "sufficient microwave energy" means any amount of microwave energy applied at any frequency that effects product formation in a reaction set forth in the inventive methods; including the transesterification reaction product fatty acid alkyl ester.

It is recognized that during the application of microwave energy and/or ultrasound, parameters other than frequency (e.g. power, duration of application) can be varied to achieve the effects of the applications, and that such variations include those known to the ordinarily skilled artisan.

It is recognized that the described invention, including the inventive methods can be used alone or in conjunction with other known methods and parameters for preparing emulsions and/or biodiesel fuel to the extent that the methods are consistent with the invention described herein. For example, such known methods include the methods described in United States Patent Application 2005/0274065, the entire contents of which application is hereby incorporated herein by reference. Thus, for example, the inventive method can comprise utilizing a heterogeneous catalyst in contact with the reaction mixture wherein the contact catalyses the reaction.

The inventive methods are useful for biodiesel fuel production. Liquid fuels represent an ever-expanding market with a scarcity of new and innovative processing techniques. Biodiesel represents a renewable fuel capable of directly replacing petro-diesel in an emerging and rapidly expanding industry. The chemical reactions in biodiesel production, transesterification and esterification, involve the combining of fatty acids with alkyl group alcohols. Transesterification is used to replace alkoxy group of the saturated ester compounds with the desired alkyl group (typically methyl- or ethyl-). Industrial biodiesel production is most commonly achieved using a base catalyzed reaction, involving catalyst (commonly sodium hydroxide), which removes a proton from the alcohol increasing its reactivity. The main drawback to the traditional industrial method revolves around the catalyst's interaction with water and free fatty acids (FFAs) and subsequent separation from byproducts. Base catalysts react to form soap with high FFA feedstock which traps unreacted oil and methanol. One solution currently employed in industry involves separating FFAs through caustic stripping and reacting separately under acidic conditions. One advanced technique to ester production is the non-catalyzed, supercritical process, where hydroxyl solvents are heated to high temperatures and pressures (~400° C. and >80 atm). Though catalyst free reactions can be achieved rapidly, the application requires conditions that are energy intensive and cost prohibitive. See "Building a Successful Biodiesel Business". Van Gerpen, J., Pruszko, R., Clements, D., and Knothe, G. Published by Biodiesel Basics. P. 51-85.

The invention leverages the utilization of advanced microwave and ultrasonic techniques to create locally severe conditions within the process material for short time durations achieving the same results as higher energy processes. Rather than maintaining a relatively large environment at elevated temperatures and pressure, the ideal environment is created in-situ and evenly dispersed through multi-energy application.

Ultrasonic energy is used to create a nearly homogeneous mixture of alcohol and oil with strict control of interfacial surface area. The resulting emulsion creates ideally dispersed reaction sites during microwave heating, where the methanol can reach superheated temperatures above that of methanol, and approaches the super-critical temperature. Therefore, the solubility and rate limited phases of the reaction are achieved rapidly through ultrasonic and microwave energy respectively. It is envisioned, without limitation, that the superheated state obtained through microwave heating and extended through ultrasonic emulsification allows for intermolecular bonds between polar methanol molecules, or hydrogen bonds, to be weakened or broken which has been purported as a mechanism for increased reactivity above the critical point.

The present invention provides a method and apparatus in which the combined application (either simultaneously or serially) of microwave and ultrasonic energy is utilized to facilitate esterification and transesterification reactions and the synthesis of a biodiesel fuel. The use of the methods greatly enhances reaction time, eliminates or significantly reduces the need for the use of a catalyst, and allows reactions to proceed under relatively low temperature, and atmospheric pressure conditions. For example, in one implementation of the present invention, the biodiesel fuel may be prepared from a reaction mixture of methanol and vegetable oil at near ambient temperatures. In a particular embodiment, the reaction mixture has a temperature of less than 75 degrees Celsius. The reaction proceeds in a matter of seconds instead of hours. Furthermore, the methods of the invention are operable when the ratio of alcohol to oil is 9:1 or less. In particular embodiments, the invention provides for utilizing alcohol to oil in a ratio of approximately 6:1. This lowered ratio greatly facilitates the separation of the finished product from the reaction mixture. It is also notable that known methods required use of relatively large amounts of catalyst, while the method described herein proceeds in the absence of a catalyst; though, inclusion of relatively small amounts of catalyst may, in some instances, still further enhance the reaction rate.

In particular embodiments of the present invention, the inventive methods provide for utilizing alcohol to oil in a ratio of 9:1, 8:1, 7:1, 6:1, 5:1, 4:1, 3:1, 2:1, or even 1:1. In others, the inventive methods provide for utilizing alcohol to oil in a ratio of 7:1, 6:1, 5:1, 4:1, 3:1, .2:1, or even 1:1. 6:1, 5:1, 4:1, 3:1, .2:1, or even 1:1. In others, the inventive methods provide for utilizing alcohol to oil in a ratio of less than 9:1, 8:1, 7:1, 6:1, 5:1, 4:1, 3:1, or 2:1. In yet others, the inventive methods provide for utilizing alcohol to oil in a ratio selected from a range of 9:1 to 1:1, or 8:1 to 1:1; inclusive of the endpoints and all possible ratios therebetween. Use of less than 3:1 alcohol to oil ratios are also encompassed in the inventive methods as being operative. However, it is recognized that such ratios are operative due to the potential for the oil component to be entirely composed of diglycerides, monoglycerides, and FFA's.

For the purposes of the invention, as used herein, "esterification" means a process of producing an alkyl ester by reaction of an alcohol with a carboxylic acid, including a fatty acid.

For the purposes of the invention, "transesterification" means the reaction between an ester and an alcohol with exchange of alkoxyl or acyl groups to form an alkyl ester. For the purposes of the invention alcohols include C1 to C5 alcohols, and fatty acids, whether in free form or as an esterlinked-moiety (e.g. fatty acids of a triglyceride) include those having C12-C20 chain lengths.

For the purposes of the invention, as used herein, "biodiesel" means compositions comprising or consisting of fatty acid alkyl esters used as a transportation and power generation fuel.

For the purposes of the invention, as used herein, "fatty acid alkyl esters" mean esters composed of a fatty acid group and an alkoxy group.

For the purposes of the invention, as used herein, "triglyceride" means a triple ester of glycerol with three fatty acids.

Methods for detecting esterification and transestrification reactants and products including mono-, di-, and triglycerides, and fatty acid alkyl esters including fatty acid methyl esters are well known in the art and include Gas chromatography (GC) techniques. For example, see Plank C. et al. (1995) Journal of Chromatography, 697, 461-468; Foglia, T. A. et al. (2004) Chromatographia 60, 305-311.

As used herein, "oil" means plant oil, animal oil or fats, waste oil or greases, rendered product, or any mixture thereof. Examples of plant oils include those derived from soybeans, jatropha seed, algae, corn, sunflower, palm, nut, safflower, olives, cotton, linseed, mustard seed, rapeseed, canola, peanuts, coconut, castor beans, tall oil and combinations thereof. Examples of animal oils include raw or rendered animal fats, brown grease, white grease, yellow grease, animal tallow, pork fats, pork oils, chicken fats, chicken oils, mutton fats, mutton oils, beef fats, beef oils, and combinations thereof. It is recognized that oils may contain a certain amount of free fatty acid. For the purposes of biodiesel fuel production, in a particular embodiment of the invention, the oil utilized in the inventive method contains less than 0.5-20% free fatty acid.

The high-speed nature of the reaction of the present invention allows for processing of a reaction mixture feedstock in a "flow-through" reactor. For example, a reactor may be designed wherein a feedstock comprising the reaction mixture is flowed through a reaction zone in which the microwave energy and the ultrasonic energy is input thereto. Residence time in the reaction zone is on the order of seconds, and the reactive material may then be directed to downstream processing.

The invention may be implemented in a number of moments. For example, in some instances, the microwave energy and ultrasonic energy may be input to a reaction mixture simultaneously. In other instances, the energy inputs may be sequential or partially overlapping.

While microwave heating and ultrasonic mixing have been employed individually in the context of chemical processing; such have not been used together for facilitating chemical reactions in general, and in particular for facilitating synthesis reactions for the preparation of biodiesel fuels. It has been found that the joint application of microwave and ultrasonic energy produces a synergistic interaction in which reaction rates are greatly facilitated. The reaction rate is greater than would be expected from the individual actions of the two inputs. While not wishing to be bound by speculation, it is theorized that this synergy is resultant from unique effects specifically attributable to each of the energy inputs, which effects can produce the synergistic interaction. For example, microwave absorption can cause superheating of a variety of materials, allowing them to be raised to temperatures, at least in localized in regions, greater than could be achieved in the absence of high pressure. This can result in the formation of areas exhibiting characteristics of critical and super critical conditions at lower temperatures and pressures. Also, in the context of ultrasonically formed emulsions of alcohol and oil such as in a biodiesel synthesis process, anisotropic heating can occur wherein the highly polar alcohol molecules are heated to a much greater degree than are the relatively non-polar oil molecules. This can create a very large temperature gradient between reactants facilitating enhanced mass transfer and reactivity, as well as further stabilizing the dispersed superheated alcohol phase through heat conduction.

Ultrasonic energy input can have a number of beneficial effects in a chemical reaction. The ultrasonic energy serves to homogenize the oil/alcohol mixture to a very high degree. Furthermore, the action of the ultrasonic energy induces cavitation in the fluid which causes very intense shear forces in the bulk liquid, very high temperatures and pressures in and around the cavitation-induced bubbles, as well as very large temperature gradients across the bubble/liquid interface. In some instances, the temperature/pressure conditions within the cavitation-induced micro bubbles are sufficiently intense to produce a reactive plasma therein. In addition, the collapse of the cavitation-induced bubbles will create very mechanical high-energy conditions in localized regions. The combined input of the microwave and ultrasonic energy create microenvironments in the relatively low temperature/low pressure reaction mixture which are very intense and which greatly facilitate the progress of the chemical reaction.

There are a variety of apparatus which may be implemented in accord with this teaching. Microwave energy having a frequency which is readily absorbed by components of the reaction mixture may be typical commercial microwave frequencies used in industrial heating applications are 2.45 GHz and 915 MHz, and apparatus operating at such frequencies may be used in the present invention. In some instances, other frequencies of electromagnetic energy, while not within the strict definition of microwave frequencies, may likewise be employed. Likewise, various frequencies of ultrasonic energy may be readily selected by one of skill in the art for the implementation of the process. There are a number of commercially utilized frequencies, and such equipment may be readily adapted to the present process. In particular instances, frequencies of 44 kHz may be utilized for the present process; but other frequencies may likewise be utilized.

Further details of the present process are disclosed in Appendix A which comprises 9 pages and forms a portion of this disclosure.

The foregoing discussion and description, including the discussion and description of the EXAMPLES, are illustrative of specific embodiments and details of the present invention. Other modifications and variations of the invention will be readily apparent to those of skill in the art, in view of the teachings presented herein. All ranges described herein include the endpoints and the values between the endpoints including integer, fraction, and/or decimal values. Each stated value in a range described herein is operative, as if stated apart from the other values collectively stated in the in the range. Patent documents and publications mentioned in the specification are indicative of the levels of those skilled in the art to which the invention pertains. These documents and publications are incorporated herein by reference to the same extent as if each individual document or publication was specifically and individually incorporated herein by reference.

EXAMPLES

Materials and Preparation

For each of the following examples the oil component of emulsions and/or reactions will consist of soybean oil, jatropha seed oil, and used soybean oil. The processed soybean oil is refined, degummed, bleached, and deodorized containing primarily triglycerides with less than 0.5% FFA. The jatropha seed oil is processed by mechanically pressing seeds and sediment separated by gravity and is comprised primarily of triglycerides. The used soybean oil resulting from processed soybean oil being utilized for deep fryer oil is filtered for food particles and dewatered and represents a mix of triglycerides and FFA acids present at as much as 20% FFA.

For each of the following examples the alcohol or polar component of emulsions and/or reactions will consist of lab grade, or at least at a 99% concentration, methanol.

For purposes in the following examples, "catalyst", shall refer to solid sodium hydroxide which is dissolved in methanol to create homogenous catalyst when noted. The amount of catalyst is expressed as the percentage of the weight of pure sodium hydroxide to the weight of the oil component.

One method for application for ultrasonic energy in the following examples include the use of a resonant body, or sonotrode, where the ultrasonic element(s) resonant an external, passive load which is inserted into the fluid mixture. Another method for the application of ultrasonic energy in the following examples includes a through wall or thin wall applicator where ultrasonic element(s) are in intimate contact with a vessel wall which contacts and/or contains the fluid mixture. The ultrasonic frequencies generated in the following examples are 22 kHz and 44 kHz.

The 22 kHz source used in the following examples consists of a horn type sonotrode, manual frequency tuning in the near vicinity of 22 kHz and power control of fractions of up to 600 Watts. The handheld applicator and coinciding amplifier is Branson brand ultrasonic homogenizer with removable 1 centimeter diameter titanium horn tips. Ultrasonic emulsification with the 22 kHz source is achieved using 50 mL Pyrex Erlenmeyer flasks containing molar ratios of alcohol to oil varying from 3:1 to 9:1 totaling volumes between 45 mL and 50 mL. The horn tip is submerged in the mixture and ultrasonic energy is typically applied for 1 to 3 minutes.

The 44 kHz source used in the following examples consists of a through type ultrasonic applicator with automatic frequency tuning in the vicinity of 44 kHz and a constant power output of 600 Watts. The ultrasonic applicator is Sonix Systems brand cleaning bath with a nearly 30 cm square active surface comprising the bottom of the stainless steel vessel. Ultrasonic emulsification with the 44 kHz source is achieved within the steel vessel of mixtures with molar ratios of alcohol to oil varying between 3:1 and 9:1 totaling volumes of at least 1 L. The vessel is charged with the appropriate mixture and ultrasonic energy is typically applied for 5 minutes.

The conventional mixing technology, or high shear mixer, used for comparison in the following examples is comprised of an adjustable electric motor, stand, and impeller. The adjustable electric motor reaches a maximum of 10,000 rpm, the stand holds the motor allowing for the impeller to be submerged, the impeller consists of thin, flexible plastic fins extending from the surface of the fluid mixture to the vessel's bottom. Conventional emulsification with the shear mixer is achieved using 50 mL Pyrex Erlenmeyer flasks containing molar ratios of alcohol to oil varying from 3:1 to 9:1 totaling volumes between 45 mL and 50 mL. The impeller is submerged fully into the fluid mixture and the adjustable electric motor is slowly increased to the maximum RPM for five minutes.

The microwave applicator used for the examples described herein consists of a multimode chamber, a 2.45 GHz magnetron, and a variable power supply. Temperatures are measured at 2 samples a second with a IR thermocouple with a spot size of at least 1 cm. The variable power supply is alters the available current to the magnetron, microwave source. With dynamic temperature feedback and observation of boiling events, the microwave energy is controlled.

Example 1

Emulsion Particle Size

To determine the particle size of dispersed alcohol droplets for emulsification technique, emulsions consist of pure soybean oil and methanol specifically in absence of catalyst, emulsion stabilizers, or reaction products, byproducts, or intermediates at atmospheric pressure and room temperature (25 Celsius). Once the emulsification treatment is completed, a single sample of the emulsion of up to 1 mL is extracted and placed on an optical slide and into an optical microscope. The optical microscopy system must be capable of 0.5 micrometer resolution corresponding to a nominal magnification of 500 times. When selecting the area for the image used for subsequent measurement, care is taken to isolate large populations of the dispersed phase, avoid contaminants, bubbles, and aggregate, and avoid the focal planes corresponding to the interface between the emulsion and the slide, slide cover, or outside environment. The resulting image used for particle measurements must be obtained within three minutes of the emulsification treatment. Each such trial must result in 300 dispersed droplets for diameter measurements.

The particle size measurement is measured as the diameter of an individual dispersed droplet via calibrated techniques. In this example, digital images are obtained from a 2 megapixel CCD sensor. The using a calibration standard, the conversion to physical length from pixel values in digital images is achieved. Such calibration values can be provided internal standards in the optical microscope setup or generated by obtaining images of known reference slides. In each case, the calibration from length to pixels is verifiable and traceable to a standard. The diameters are measured as the distance between the average extents of dispersed phase in number of pixels and converted to micrometers.

Using this technique at least 3 trials worth of diameter measurements for a given emulsification treatment and material composition resulting in at least 900 dispersed droplets are measured to determine repeatability statistics for the method. The resulting measurements are used to calculate the geometric average and the geometric standard deviation which indicates the average size and relative dispersion according to a log normal distribution, as described under "Statistical Calculations". Results are shown in FIG. 1 and Table 1.

TABLE 1

| Technique | $\bar{x}_g$ | $\sigma_g$ | $\bar{x}_a$ | $\sigma_a$ |
|---|---|---|---|---|
| Shear Mixer | 3.3116 | 1.9195 | 4.4063 | 5.0364 |
| 22 kHz | 3.5687 | 1.544 | 3.9472 | 1.9730 |
| 44 kHz | 1.8164 | 1.714 | 2.1205 | 1.3788 |

FIG. 1 shows the log-normal distribution of dispersed methanol droplets in soybean oil by way of ultrasonic and conventional shear emulsification. As shown in FIG. 1, the dispersed (emulsified) phase has an average droplet (particle) size of less than 5 micrometers, and a distribution of less than 1.85 geometric standard deviation. Alternatively, if the same data series is subjected to the arithmetic average and standard deviation calculation described below, the dispersed (emulsified) phase has an average droplet (particle) size of less than 5 micrometers, and a distribution of less than 3.00 arithmetic standard deviation.

Statistical Calculations:

The geometric average is calculated as:

$$\overline{x}_g = \exp\left(\frac{1}{n}\sum \ln(x)\right); \text{ or}$$

the arithmetic average is calculated as:

$$\overline{x}_a = \left(\frac{1}{n}\sum (x)\right);$$

where x is the data series of diameter measurements and n is the total number of measurements.

The geometric standard deviation is calculated as:

$$\sigma_g = \sqrt{\frac{\sum (\ln(x)-\ln(\overline{x}_g))^2}{n}} \text{ ; or}$$

the arithmetic standard deviation is calculated as:

$$\sigma_a = \sqrt{\frac{\sum (x-\overline{x}_a)^2}{n}}.$$

The resulting log-normal distribution is calculated as:

$$f(x) = \frac{1}{\sqrt{2\pi\ln(\sigma_g)}}\exp\left[-\frac{(\ln(x)-\ln(\overline{x}_g))^2}{2\ln(\sigma_g)}\right]$$

Example 2

Emulsion Particle Size

Figure 2:
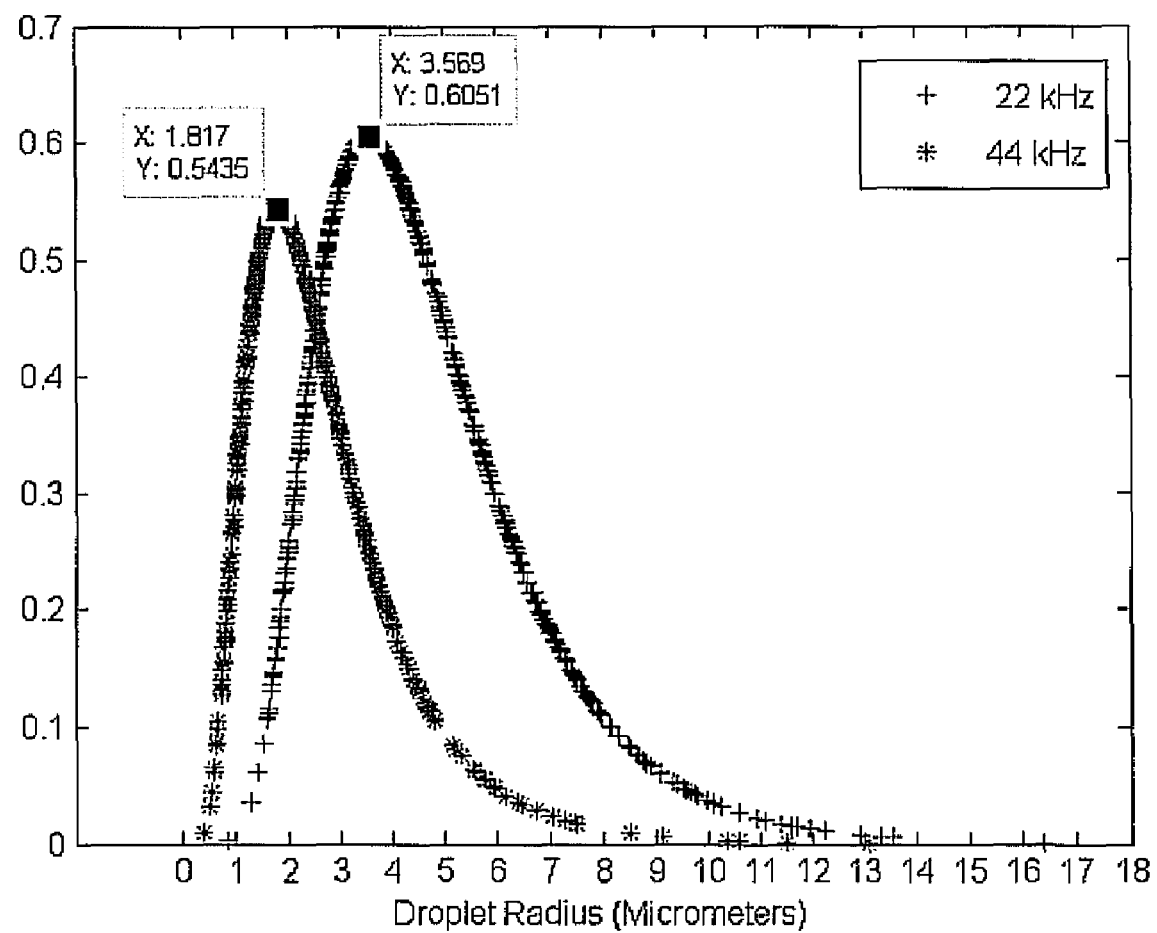
FIG. 2 shows the use of higher frequency ultrasonics used to create a finer dispersed (emulsified) phase than that of a lower frequency treatment.

In order to specify and control the size distributions emulsions prepared for subsequent microwave heating treatment, the control of ultrasonic frequency is used. The desired emulsion can result from a single frequency treatment, or a combination of frequencies either in series or simultaneously either comprising the entire emulsification system or as a component within a system comprising of other techniques. The control of ultrasonic frequency and treatment order is used for the preparation of emulsions for microwave heating. FIG. 2 shows the use of higher frequency ultrasonics used to create a finer dispersed (emulsified) phase than that of a lower frequency treatment.

Example 3

Enhancing Microwave Superheated Temperature

Figure 3:
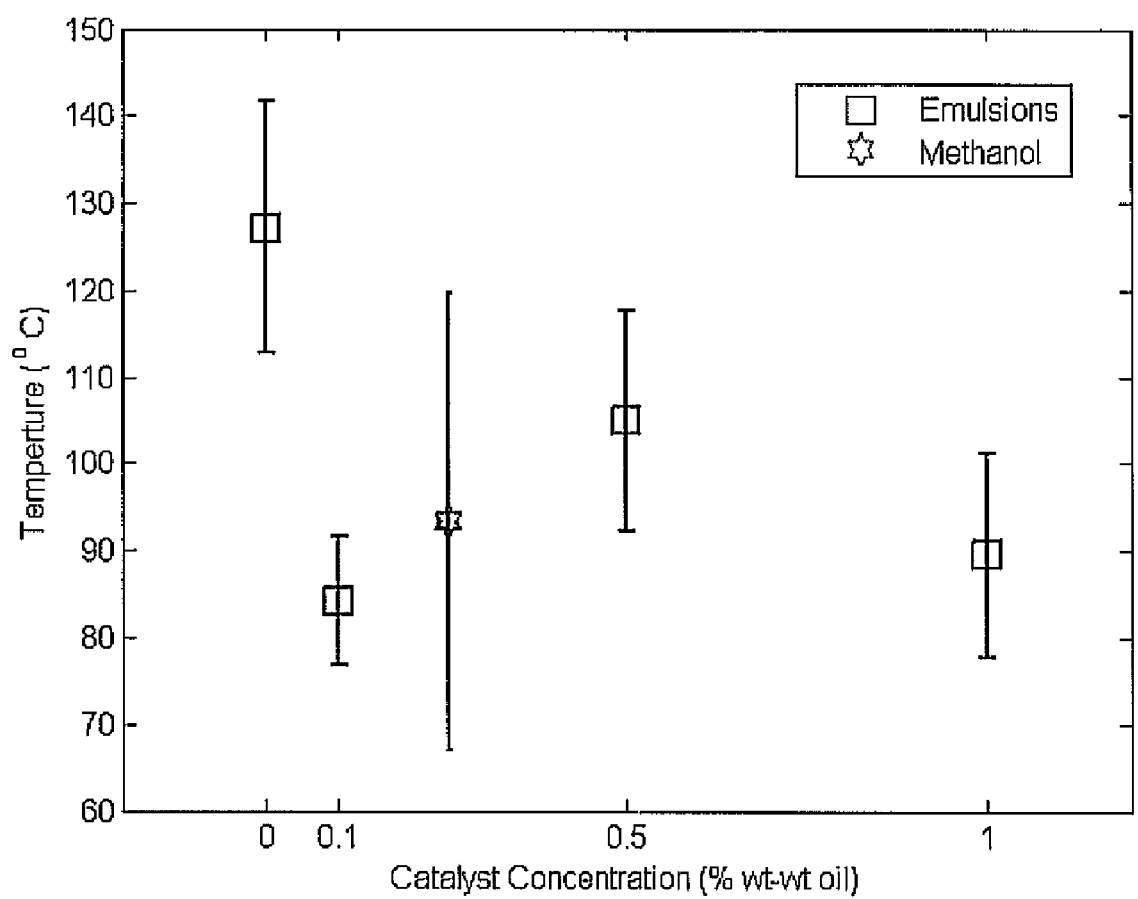
FIG. 3 shows the average superheated boiling temperature of ultrasonically formed emulsions with varying concentrations of sodium hydroxide catalyst compared with the average superheated boiling temperature of pure methanol. The superheated temperature of methanol is enhanced when ultrasonically dispersed in a catalyst free emulsion.

The objective of enhancing microwave superheated temperature was pursued using emulsions with molar ratios of methanol to soybean of 3:1, 6:1, and 9:1 and 0%, 0.1%, 0.5%, and 1.0% sodium hydroxide catalyst by weight of oil. Each sample was subjected to the four microwave powers until boiling twice. The boiling point associated with each catalyst concentration is averaged and the standard deviation calculated. The results are compared to the averaged values for pure methanol to indicate which samples extend the superheated boiling point of methanol in FIG. 3. The result of the comparison indicates that catalyst free ultrasonically formed emulsions were most capable of extending the superheated boiling point of methanol. The addition of catalyst created nucleated boiling and thermal instability while heating, resulting in lower average boiling temperatures than without catalyst.

Example 4

Anisothermal Heating

Figure 4:
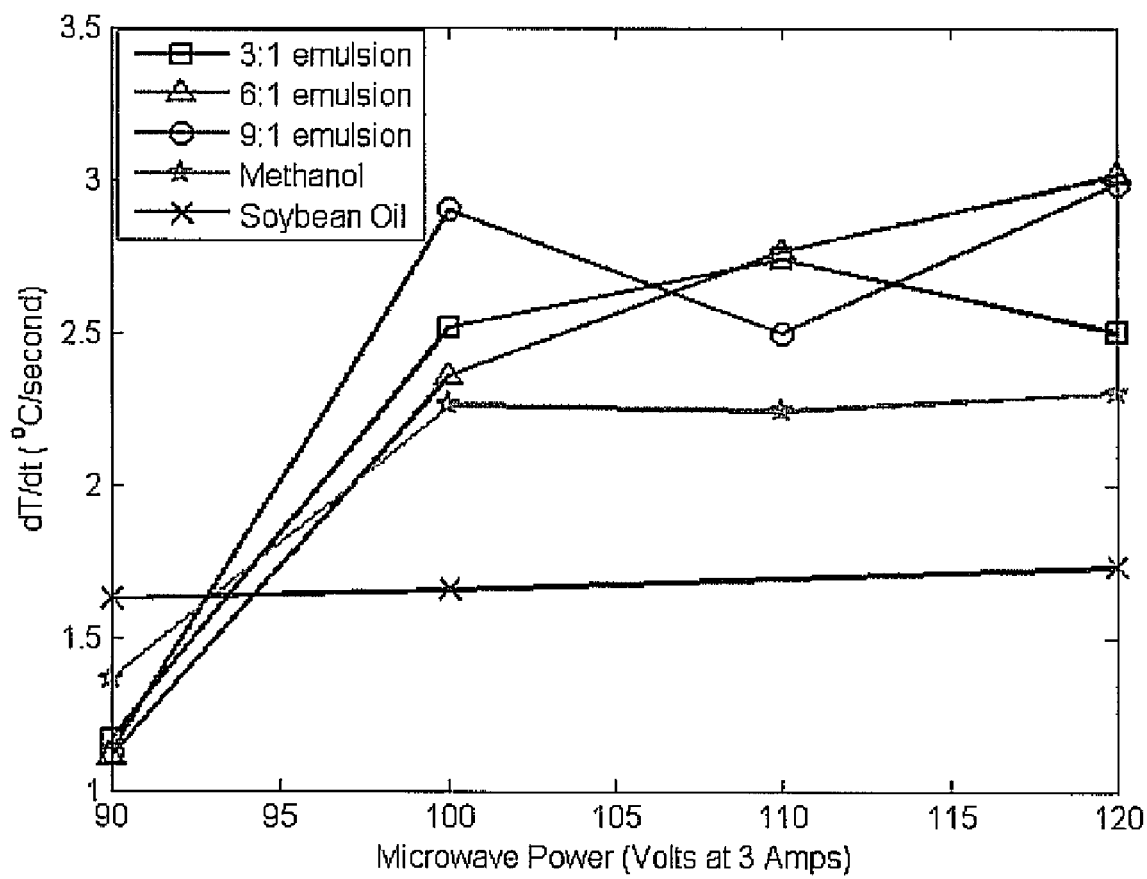
FIG. 4 shows the microwave heating rate of ultrasonically formed catalyst free emulsions consisting of methanol and soybean oil compared to the pure components indicates anisothermal heating effects. As the suspended methanol droplets rise in temperature, the heat conducted into the surrounding oil delays the limiting effect of decreasing dielectric loss with temperature.

The heating rates calculated for the pure materials were compared to the ultrasonically prepared emulsions. Where the superheating test verified the ability to stabilize superheated methanol, this test indicates if the emulsion enhances the dielectric loss practically. The results in FIG. 4 indicate that heating rates above that of methanol can be achieved with ultrasonic emulsification. The result can be explained in terms of anisothermal microwave heating. As the dispersed methanol heats, the surrounding oil is heated through heat conduction allowing the emulsion's heating rate to exceed that of methanol. The heating rates are difficult to directly relate to the permittivity measurement due to anisothermal heating. For example, as methanol is heated it's dielectric loss changes which is accounted for in the microwave heating rates of pure methanol. However, as the methanol transfers heat to the oil, the rate at which the heating affects the dielectric loss is reduced. The net result is a mixture that can achieve heating rates and superheated temperatures above its dispersed phase.

Example 5

Ultrasonic Emulsification/Transesterification

The advantage of an ultrasonically formed emulsion as compared to a classical mixed emulsion is demonstrated. The molar ratio of 9:1 was chosen to ensure that an excess of methanol remains if any boiling occurs and 3% sodium hydroxide catalyst by weight of oil to accelerate the reaction. The ultrasonic horn at 22 kHz and full power was compared to the rotary mixer at 10,000 rpm. The reaction completion was measured by weight of glycerol byproduct. The precision scale was determined to measure to within 0.00005 grams. The measurement correlates to the conversion of mono-glycerides to glycerol. The products that form when glycerol is observed were confirmed by CC analysis (referenced above), to be the expected methyl esters resulting from transesterification.

Figure 5:
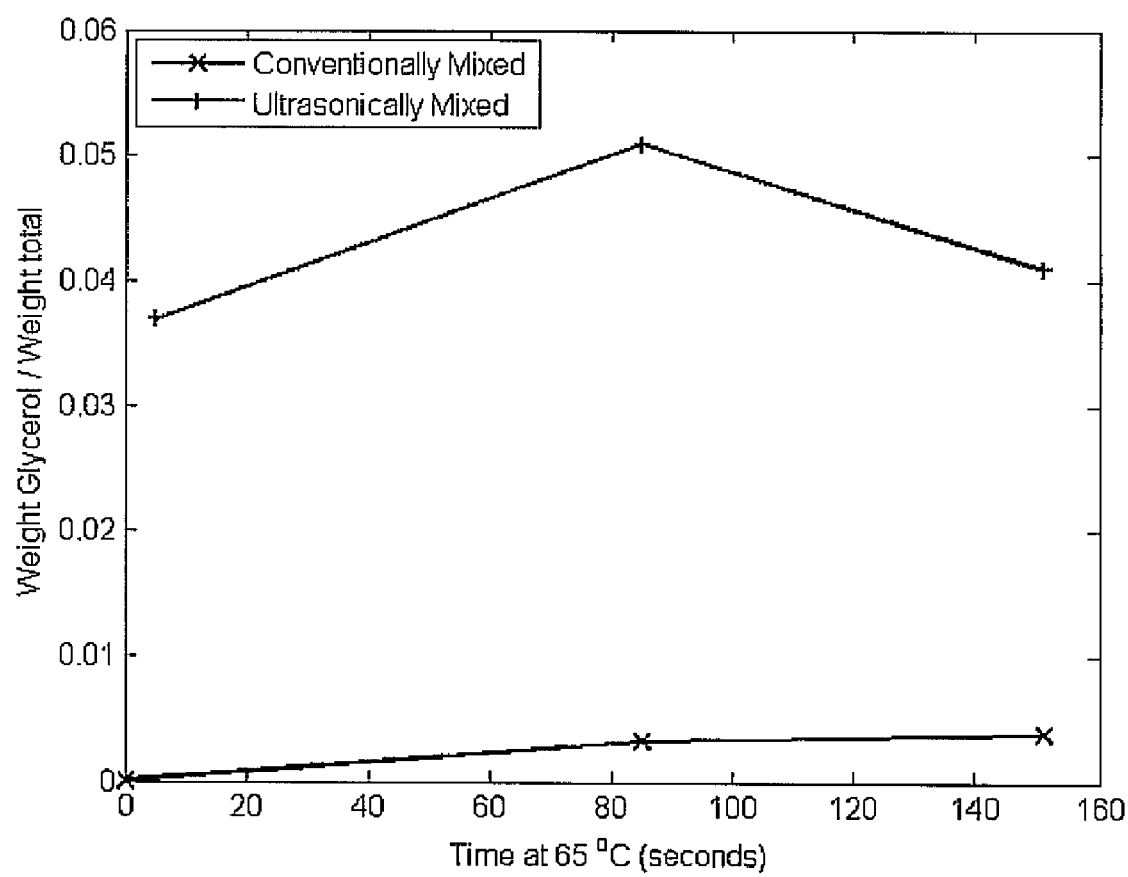
FIG. 5 shows comparison of the rate of formation of glycerol resulting from the transesterification reaction between conventionally mixed and ultrasonically prepared emulsions heated with microwaves. The emulsions are of 9:1 molar ratio of methanol to oil catalyzed by 0.3% sodium hydroxide by weight of oil. The faster rate is indicated in the case of the ultrasonically prepared sample due to the optimization of microwave heating.

Three samples were mixed utilizing each technique and microwave heated to near the boiling point of methanol and maintained at that temperature for three different amounts of time. The results of the study, shown in FIG. 5, show a dramatic improvement in reaction rate in the case of ultrasonically mixed emulsions.

Catalyst free ultrasonically formed emulsions were heated with microwave radiation for the purpose of transesterification. Initial attempts focused on reaching as high of temperature as possible. However, corresponding GC analysis indicated that negative results were obtained during initial attempts. The negative results were attributed to the boiling and evaporation of MeOH. In other words, it is believed that the observed initial lack of transesterification is likely the result of methanol evaporation, which encourages back reaction to triglycerides. To prevent boiling the microwave power was adjusted during the process by observation. This means that when boiling first begins, the power to the magnetron is reduced or turned off. As the solution stops boiling, the microwave power is slowly increased until another boiling event. One such attempt resulted in the solution to reaching over 230° C., which is above the critical temperature. At this temperature, the remaining methanol boils out in very fine bubbles which are evenly distributed throughout the mixture. A similar description is given in the case of the superheated limit as described in Kiran E, Debenedetti P G, and Peters C J (Ed.) (2000) Supercritical Fluids, Fundementals and Applications, Dordrecht: Kluwer Academic Publishers. Thus, the technique is capable is revealed as a practical means to maximize the limit to superheating in atmospheric conditions of reaction mixtures. Which, in the case of dispersed phase being a polar molecule, such as methanol, the result is the minimization the strength of intermolecular hydrogen bonds permitting nearly supercritical reaction enhancements.

Figure 6:
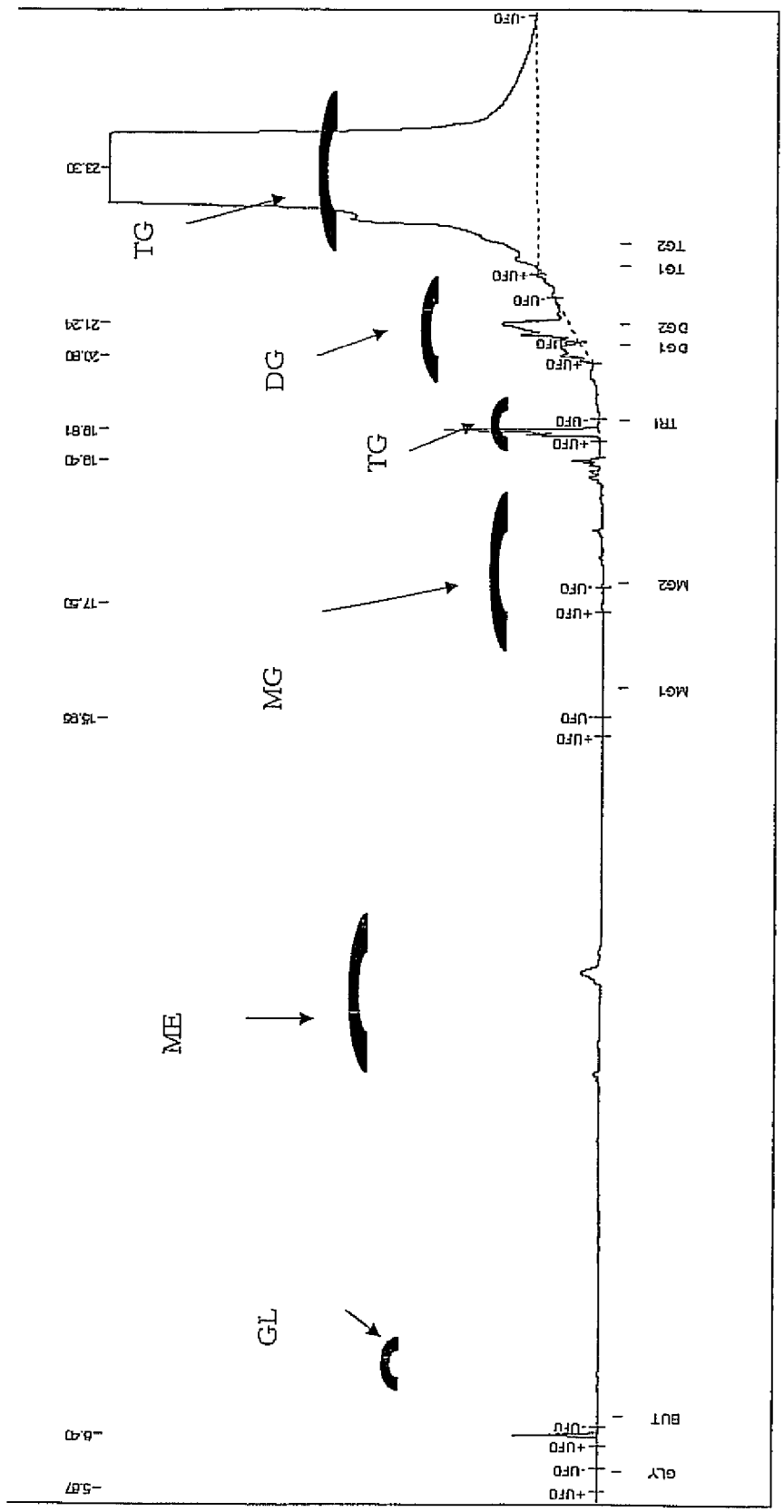
FIG. 6 shows GC analysis indicating successful transesterification using 22 kHz ultrasonic emulsification for thirty seconds and microwave superheating to 85° C. for 220 seconds. Sample is of 9:1 molar ratio of methanol to soybean. GL is the byproduct glycerine, ME is a methylester fuel product, MG is a monoglyceride, TG are triglycerides, and DG are diglycerides.

The next set of experiments still utilized controlled microwave heating to maximize the superheated temperature; however, they were removed and quenched at the onset of boiling. A 9:1 molar ratio of methanol to soybean oil ultrasonically mixed with the 22 kHz horn at full power for thirty seconds, heated in the microwave to 85° C. for 220 seconds indicated a small, but noticeable methyl ester peak in the GC chromatograph, as shown in FIG. 6. It is noted that in this particular trial, nearly no free glycerol was formed, indicating that only the first of the stepwise transesterification reactions occurred, namely triglyceride to di-glyceride with the fatty acid molecule released converted to a methyl ester. These results were confirmed for reproducibility, and to rule out possible catalyst contamination.

Figure 7:
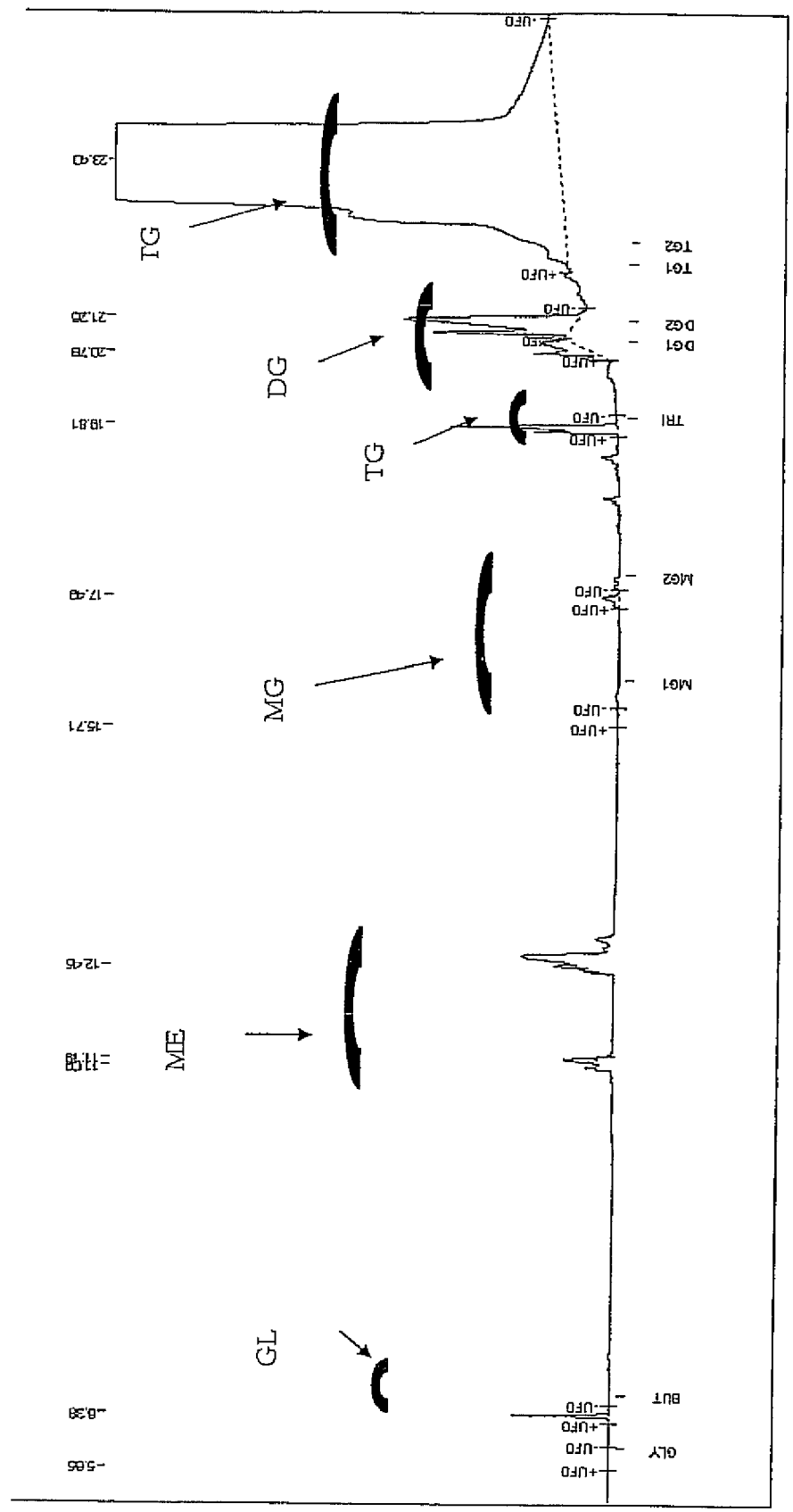
FIG. 7 shows GC analysis indicating successful transesterification using 22 kHz ultrasonic emulsification for thirty seconds and microwave superheating to 85° C. for 220 seconds. Sample is of 9:1 molar ratio of methanol to jatropha seed oil. GL is the byproduct glycerine, ME is a methylester fuel product, MG is a monoglyceride, TG are triglycerides, and DG are diglycerides.

Finally, the experiment described in the preceding paragraph was replicated using jatrohpha seed oil resulting in more significant methyl ester production, as shown in FIG. 7. Again these results were confirmed for reproducibility, and to rule out possible catalyst contamination.

In summary, the experiments in the EXAMPLES above illustratively confirmed the ability of ultrasonic emulsification to optimize microwave superheating as measured by the extension of the superheated boiling point. The use of catalyst inhibits the effective extension of the superheated boiling temperature of ultrasonically formed emulsions. The catalyst free ultrasonically formed emulsion is shown to increase the rate of heating through anisothermal effects. The use of ultrasonics to prepare tradition base catalyzed reactants for microwave heating is shown to enhance the reaction kinetics as evident from glycerol byproduct formation. The combined use of microwaves and ultrasound are show to enable catalyst free transesterification is verified by GC analysis.

The invention claimed is:

1. A method for enhancing a chemical reaction or process in a reaction mixture, said method comprising the steps of:
providing a reaction mixture comprising at least two immiscible reactants with the proviso that no catalyst is present in the reaction mixture or a catalyst is present in an amount of 0.1% or less by weight of one of the two immiscible reactants;
inputting microwave energy into said reaction mixture; and
inputting ultrasonic energy into said reaction mixture;
wherein the chemical reaction or process in the reaction mixture is performed under reaction conditions characterized as lower than supercritical temperature and pressure.

2. The method of claim 1, wherein the step of inputting said microwave energy is carried out for a first period of time, and the step of inputting said ultrasonic energies carried out for a second period of time; and
wherein said first and second periods of time at least partially overlap.

3. The method of claim 2 wherein said second period of time is commenced before said first period of time is commenced.

4. The method of claim 1, wherein said step of inputting said microwave energy is carried out for a first period of time, and said step of inputting said ultrasonic energies carried out for a second period of time; and wherein
said first and second periods of time do not overlap.

5. The method of claim 4 wherein said inputting of ultrasound energy is commenced before said inputting of microwave energy.

6. The method of claim 1, wherein said reaction comprises an esterification reaction or a transesterification reaction, or a mixture thereof 7. The method of claim 1, provided that when the reaction consists of an esterification reaction between n-butanol and stearic acid, the reaction mixture does not comprise k catalyst.

8. The method of claim 1, wherein the inputting of said ultrasonic energy produces an emulsion that has an average particle size of less than 5 micrometers.

9. The method of claim 1, wherein the inputting of said ultrasonic energy produces an emulsion; and wherein 90% of particles in said emulsion have a particle size of less than 10 micrometers.

10. The method of claim 1, wherein said ultrasonic energy has a frequency selected from the group consisting of: a frequency of at least 22 KHz, a frequency in the range of 22 KHz to 1.0 MHz, a frequency in the range of 22 KHz to 0.5 MHz, a frequency in the range of 22 KHz to 100 KHz, a frequency in the range of 22 to 50 KHz, a frequency in the range of 22 to 30 KHz, or a frequency in the range of 22 to 25 KHz.

11. The method of claim 1, wherein said ultrasonic energy has a frequency of 22 or 44 KHz.

12. The method of claim 1, wherein said microwave energy has a frequency of 2.45 GHz or 915 MHz.

13. The method of claim 1 wherein said inputting of ultrasound energy is commenced before said inputting of microwave energy.

14. A method for enhancing a transesterification reaction in a reaction mixture, said method comprising the steps of:
providing a reaction mixture comprising at least two immiscible reactants;
inputting microwave energy into said reaction mixture; and
inputting ultrasonic energy into said reaction mixture;
wherein said at least two immiscible reactants are an alcohol and an oil, and said reaction mixture contains no catalyst or further comprises a catalyst in an amount of 0.1% or less by weight of the oil; and wherein the transesterification reaction in the reaction mixture is performed under reaction conditions characterized as lower than supercritical temperature and pressure.

15. The method of claim 14, wherein said reaction mixture does not comprise a catalyst.

16. The method of claim 14, wherein the ratio of said alcohol to said oil is selected from a range of 9:1 to 1:1, or from a range of 8:1 to 1:1.

17. The method of claim 14, wherein at least one fatty acid alkyl ester is produced by said reaction.

18. The method of claim 14, wherein the inputting of said ultrasonic energy produces an emulsion, and said inputting of microwave energy further comprises inputting sufficient microwave energy into said emulsion to produce one or more fatty acid alkyl esters.

19. The method of claim 14 wherein one or more fatty acid alkyl esters are detectably produced by said reaction in less than 5 hours; in less than 59 minutes; or in less than 10 minutes.

20. The method of claim 14 wherein the inputting of said ultrasonic energy produces an emulsion, and said inputting of microwave energy further comprises inputting sufficient microwave energy into said emulsion to allow said transesterification to proceed at a temperature below the critical temperature of said alcohol.

21. The method of claim 14 wherein said reaction is carried out at a temperature of at least 40° C. below the supercritical temperature of said alcohol.

22. The method of claim 14, wherein said temperature is in the range of 40-150, 50-140, 60-130, 65 to 145, 70-120, or 60-110° C.

23. The method of claim 14, wherein said temperature is less than 125° C.

24. A method for manufacturing biodiesel fuel, said method comprising the steps of:
   providing a reaction mixture which includes an oil and an alcohol, with the proviso that no catalyst is present in the reaction mixture or a catalyst is present in an amount of 0.1% or less by weight of the oil;
   inputting radio frequency or microwave energy into said reaction mixture so as to heat said mixture to a temperature less than 125° C., at atmospheric pressure;
   inputting ultrasonic energy into said reaction mixture; and
   detectably producing at least one fatty acid alkyl ester.

25. The method of claim 24, wherein said oil is a vegetable oil.

26. The method of claim 24, wherein said oil is derived from: biomass, algae, animal tallow, waste oil, and combinations thereof.

27. The method of claim 24, wherein said alcohol comprises a C1-C5 alkyl alcohol.

28. The method of claim 1, wherein at least 90% of the two immiscible reactants are emulsified to an emulsion by said ultrasonic energy, and microwave energy is inputted into said emulsion.

29. The method of claim 24, wherein at least 90% of the two immiscible reactants are emulsified to an emulsion by said ultrasonic energy, and microwave energy is inputted into said emulsion.

30. The method of claim 24, wherein the temperature is less than 75° C.

\* \* \* \* \*

UNITED STATES PATENT AND TRADEMARK OFFICE
CERTIFICATE OF CORRECTION

| | | |
|---|---|---|
| PATENT NO. | : 8,052,848 B2 | Page 1 of 1 |
| APPLICATION NO. | : 12/146932 | |
| DATED | : November 8, 2011 | |
| INVENTOR(S) | : Matthew M. Kropf | |

It is certified that error appears in the above-identified patent and that said Letters Patent is hereby corrected as shown below:

Column 4, line 19 - delete "13" and insert --130--
Column 10, line 50 - after "stated" delete "in the"
Column 11, line 64 - after "supply" delete "is"
Column 14, line 26 - delete "it's" and insert --its--
Column 14, line 49 - delete "CC" and insert --GC--
Column 15, line 13 - after "capable" insert --and--
Column 15, line 18 - after "minimization" insert --of--
Column 15, line 51 - delete "show" and insert --shown--

Signed and Sealed this

Twenty-fourth Day of April, 2012

David J. Kappos
*Director of the United States Patent and Trademark Office*